United States Patent
Robinson

(10) Patent No.: US 11,678,663 B2
(45) Date of Patent: Jun. 20, 2023

(54) MULTI-PURPOSE DISINFECTANT, DEGREASER, CLEANER AND HERBICIDE

(71) Applicant: Gregory E. Robinson, Tonawanda, NY (US)

(72) Inventor: Gregory E. Robinson, Tonawanda, NY (US)

( * ) Notice: Subject to any disclaimer, the term of this patent is extended or adjusted under 35 U.S.C. 154(b) by 344 days.

(21) Appl. No.: 17/117,082

(22) Filed: Dec. 9, 2020

(65) Prior Publication Data

US 2022/0174948 A1     Jun. 9, 2022

(51) Int. Cl.

| | |
|---|---|
| *C11D 1/62* | (2006.01) |
| *C11D 1/835* | (2006.01) |
| *C11D 3/30* | (2006.01) |
| *C11D 3/48* | (2006.01) |
| *A01N 25/30* | (2006.01) |
| *A01N 33/12* | (2006.01) |
| *C11D 3/12* | (2006.01) |
| *C11D 3/18* | (2006.01) |
| C11D 1/40 | (2006.01) |
| C11D 1/72 | (2006.01) |
| C11D 1/75 | (2006.01) |

(52) U.S. Cl.
CPC ............ *A01N 33/12* (2013.01); *A01N 25/30* (2013.01); *C11D 1/835* (2013.01); *C11D 3/1246* (2013.01); *C11D 3/188* (2013.01); *C11D 3/30* (2013.01); *C11D 3/48* (2013.01); C11D 1/40 (2013.01); C11D 1/72 (2013.01); C11D 1/75 (2013.01)

(58) Field of Classification Search
CPC .......... C11D 1/62; C11D 1/665; C11D 1/835; C11D 3/30; C11D 3/48; A01N 25/30; A01N 33/12

See application file for complete search history.

(56) References Cited

U.S. PATENT DOCUMENTS

| | | |
|---|---|---|
| 6,887,830 B2 | 5/2005 | Stridde |
| 8,153,561 B2 | 4/2012 | Messerschmidt |
| 8,273,687 B2 | 9/2012 | Messerschmidt |
| 10,278,386 B2 | 5/2019 | Ward |
| 2016/0237379 A1* | 8/2016 | Chow ................. C11D 11/0023 |

* cited by examiner

*Primary Examiner* — Brian P Mruk
(74) *Attorney, Agent, or Firm* — Kloss Stenger & Gromley LLP; Brendan Lillis

(57) ABSTRACT

A natural cleaning and herbicide composition having an quaternary ammonium compound, one or more additional amine-based surfactants, and an herbicidally active limonene component, that synergistically creates an effective COVID-19 disinfectant in wipes, an effective clearer for bulk cleaning applications, as well as an impressive gross soils remover following EPA protocol. The composition may further contain sodium silicate, tetrasodium iminodisuccinate, an ethanolamine, caustic potash, and/or water. A formulation of the present disclosure comprises a mixture of about 74% soft water, about 1% Tetrasodium Iminodisuccinate, about 0.5% Monoethanolamine, about 0.5% Sodium Silicate, about 2% alkali surfactant, about 12% Ethoxylated Amine, about 1% Amine Oxide, about 1% Quaternary Amine, and about 6% Limonene.

20 Claims, No Drawings

MULTI-PURPOSE DISINFECTANT, DEGREASER, CLEANER AND HERBICIDE

RELATED APPLICATIONS

Not Applicable

STATEMENT REGARDING FEDERALLY SPONSORED RESEARCH OR DEVELOPMENT

Not Applicable

STATEMENT REGARDING PARTIES TO A JOINT RESEARCH AGREEMENT

Not Applicable

REFERENCE TO SEQUENCE LISTING, TABLE, OR COMPUTER PROGRAM LISTING

Not Applicable

STATEMENT REGARDING PRIOR DISCLOSURES BY THE INVENTOR OR A JOINT INVENTOR UNDER 37 C.F.R. 1.77(B)(6)

Not Applicable

TECHNICAL FIELD

This disclosure relates to a multi-purpose liquid composition, and in particular to a liquid or wipe that is effective as a degreaser, disinfectant (against COVID-19 and others), and herbicide for ground vegetation control, while also being non-toxic and biodegradable.

BACKGROUND ART

The present disclosure relates to an environmentally benign, yet powerful, cleaning and herbicide composition. Commercially available cleaning compositions and herbicides are generally only available as separate compositions, and moreover generally incorporate chemicals that are detrimental to the environment. These toxic chemicals may include solvents, boosters and chelators. Other common ingredients in cleaning compositions that can harm the environment include phosphates, nitrilotriacetic acid, ethylenediaminetetraacetic acid, nonylphenol ethoxylates, and heavy metals; some of which have been demonstrated to accumulate in ground water. Glyphosate is a commonly-used toxic herbicide.

Toxic chemicals from cleaning and herbicide compositions have been found in fresh water such as ponds, lakes, and streams in high levels. Aquatic organisms, including both plants and animals, are at risk from exposure to high levels of these chemicals in water systems. Further, humans exposed to these chemicals through water systems may suffer from health problems. Additionally, many cleaning compositions and/or herbicides contain toxic or carcinogenic chemicals, including volatile organic compounds (VOCs) and hazardous air pollutants (HAPs) that can pollute the air. As a result, alternative cleaning and/or herbicide compositions which do not contain these and other environmental and bio-hazardous chemicals are desired.

Typical cleaning compositions require multiple surfactants, solvents, and builder combinations to achieve adequate consumer performance. For cost-effectiveness and out of concern for the environment, focus has shifted to producing cleaning compositions containing naturally occurring chemicals. There has long been a need for a naturally-based cleaning composition that achieves acceptable consumer performance with a limited number of natural components compared to highly developed compositions using synthetic surfactants and solvents.

Prior compositions have not successfully minimized ingredients while maintaining quality of cleaning, particularly with environmentally benign compounds. Accordingly, it is an object of the present disclosure to provide a combination cleaning and herbicide composition that overcomes the disadvantages and shortcomings associated with existing compositions.

SUMMARY

This composition is a multi-purpose cleaner, disinfectant and herbicide, particularly effective for both heavy grease removal and weed removal. Heavy grease includes the type that may accumulate on the sides or backs of diesel-powered public transit buses and locomotives, subway cars, intercity trains and light rail vehicles.

In accordance with the above objects and those that will be mentioned and will become apparent below, one embodiment of the present invention comprises a natural cleaning and herbicide composition having an quaternary ammonium compound (a "quat"), one or more additional amine-based surfactants, and an herbicidally active limonene component, that synergistically creates an effective COVID-19 disinfectant in wipes, an effective clearer for bulk cleaning applications, as well as an impressive gross soils remover following EPA protocol. Additionally, the formulation may contain an abrasive, such as sodium silicate. Further, the formulation may include tetrasodium iminodisuccinate, an ethanolamine, caustic potash, and/or water.

The quat component may be Tomamine Q-17-2 (75% active isotridecyloxypropyl bis-(2-hydroxyethyl) methyl ammonium chloride.

The amine-based surfactants may include an amine oxide such as Tomamine AO-14-2 (50% active bis-(2-hydroxyethyl) isodecyloxypropylamine oxide), in addition to ethoxylated amines Tomamine E-14-5 (poly (5) oxyethylene isodecyloxypropylamine) and/or Tomamine E-17-5 (poly (5) oxyethylene isotridecyloxypropylamine).

The limonene component may be d-limonene.

The iminodisuccinic acid tetrasodium salt may be Baypure CX 100/34%, N-(1,2-dicarboxyethyl) aspartic acid.

The ethanolamine may be monoethanolamine (MEA).

The sodium silicate may be a premix anhydrous sodium metasilicate.

Optional compositions further contain dyes and/or fragrances.

DESCRIPTION OF THE PREFERRED EMBODIMENTS

This disclosure provides formulations for environmentally friendly specialty combination cleaning and herbicidal chemicals.

Methods of Application.

The cleaning and herbicidal composition of the present disclosure may be applied to the target surface by a variety of means, including direct application by means of a spray, pump or aerosol dispensing means, or by other means, including the use of a carrier, or dilution system, as for example, but not limited to a wash, dip or immersion process. Regarding applications by use of a carrier, such suitable carriers include, for example, an impregnated wipe, foam, sponge, cloth, towel, tissue or paper towel or similar releasably absorbent carrier that enables the inventive compositions to be applied by direct physical contact and transferred from the carrier to the target surface, generally during a spreading, padding, rubbing or wiping operation. Combinations of a direct application, followed by a spreading, padding, rubbing or wiping operation performed with the aid of a foam, sponge, cloth, towel, tissue or paper towel, squeegee or similar wiping implement is also suitable for applying the cleaning compositions of the present disclosure.

The cleaning composition may be also be sprayed directly onto the target surface and therefore are typically packaged in a spray dispenser. The spray dispenser can be any of the manually activated means for producing a spray of liquid droplets as is known in the art, e.g., trigger-type, pump-type, electrical spray, hydraulic nozzle, sonic nebulizer, high pressure fog nozzle, non-aerosol self-pressurized, and aerosol-type spray means. Automatic activated means can also be used herein. These types of automatic means are similar to manually activated means with the exception that the propellant is replaced by a compressor. The spray dispenser can be an aerosol dispenser. Said aerosol dispenser comprises a container which can be constructed of any of the conventional materials employed in fabricating aerosol containers. A more complete description of commercially available aerosol-spray dispensers appears in U.S. Pat. Nos. 3,436,772 and 3,600,325, both of which are fully incorporated herein by reference. Alternatively, the spray dispenser can be a self-pressurized non-aerosol container having a convoluted liner and an elastomeric sleeve. A more complete description of self-pressurized spray dispensers can be found in U.S. Pat. Nos. 4,260,110; 5,111,971 and 5,232,126, both of which are fully incorporated herein by reference. The container and the pump mechanism can be constructed of any conventional material employed in fabricating pump-spray dispensers, including, but not limited to: polyethylene; polypropylene; polyethyleneterephthalate; blends of polyethylene, vinyl acetate, and rubber elastomer. Other materials can include stainless steel. A more complete disclosure of commercially available dispensing devices appears in: U.S. Pat. Nos. 4,082,223; 4,161,288; 4,274,560; 4,434,917; 4,735,347; 4,819,835; 4,895,279; and 5,303,867; all of which are fully incorporated herein by reference.

Composition Benefits

This composition is a multi-purpose cleaner, disinfectant and herbicide, particularly effective for heavy grease removal, destruction of COVID-19 and other nefarious microorganisms, as well as weed removal in the form of ground vegetation control. Heavy grease includes the type that may accumulate on the sides or backs of diesel-powered public transit buses and locomotives, subway cars, intercity trains and light rail vehicles. The herbicidal nature of this composition is such that it is selective in its effectiveness. For example, spraying the disclosed solution on mulch will kill weeds, but will not kill larger plants growing next to the weeds.

This composition further provides for a solution that combines d-limonene with water in such a way that the d-limonene stays in solution without milking out. Typically, adding cold water to d-limonene will cause the mixture to turn milky white. However, the disclosed composition maintains the appearance of a clear liquid even after d-limonene is added to the mixture. In particular, the use of an intermediate mixture combining ethoxylated amines Tomamine E-14-5 (poly (5) oxyethylene isodecyloxypropylamine) and Tomamine E-17-5 (poly (5) oxyethylene isotridecyloxypropylamine), along with a surfactant such as Tomamine Alkali Surfactant, prevents the d-limonene from milking out when combined to the rest of the composition as described herein.

The disclosed composition synergistically creates an effective COVID-19 disinfectant in wipes, an effective clearer for bulk cleaning applications, as well as an impressive gross soils remover following EPA protocol.

Formulation Examples

A formulation of the present disclosure comprises a mixture of about 74% soft water, about 1% Tetrasodium Iminodisuccinate, about 0.5% Monoethanolamine, about 0.5% Sodium Silicate, about 12% Ethoxylated Amine, about 1% Amine Oxide, about 1% Quaternary Amine, and about 6% Limonene.

The formulation of the present disclosure is generally applied at a pH of between 12 and 12.5; however, depending upon the intended use of the product, the pH can be adjusted.

The CAS number of water is 7732-18-5. The CAS number of Tetrasodium Iminodisuccinate is 144538-83-0. The CAS number of Monoethanolamine is 141-43-5. The CAS number of Sodium Silicate is 1344-09-8.

The quat component may be Tomamine Q-17-2 (75% active isotridecyloxypropyl bis-(2-hydroxyethyl) methyl ammonium chloride).

The amine-based surfactants may include an amine oxide such as Tomamine AO-14-2 (50% active bis-(2-hydroxyethyl) isodecyloxypropylamine oxide), in addition to ethoxylated amines Tomamine E-14-5 (poly (5) oxyethylene isodecyloxypropylamine) and/or Tomamine E-17-5 (poly (5) oxyethylene isotridecyloxypropylamine).

The limonene component may be d-limonene.

The iminodisuccinic acid tetrasodium salt may be Baypure CX 100/34%, N-(1,2-dicarboxyethyl) aspartic acid.

The ethanolamine may be monoethanolamine (MEA).

The sodium silicate may be an anhydrous sodium metasilicate.

A specific embodiment of the formulation of the present disclosure comprises a mixture of about 75% water, about 1% Baypure CX 100/34%, about 0.5% MEA, about 0.5% anhydrous sodium metasilicate, about 2% Tomamine alkali surfactant, about 8% Tomamine E-14-5, about 4% Tomamine E-17-5, about 1% Tomamine AO-14-2, about 1% Tomamine Q-17-2, about 0.5% caustic potash, and about 6.5% d-limonene.

The formulation of the present disclosure is applied at a pH of about 12.0-12.5.

A preferred method of mixing at batch of the disclosed composition is now disclosed.

Step 1—Make Intermediate Quat 1.

Add the following ingredients to a 55 gal container in the order and amounts listed, mixing after each addition: about 43 gal of soft water, about 1.75 gal of Baypure CX 100/34%, 3100 mL of MEA, about 2600 mL of anhydrous sodium metasilicate, about 1.65 gal of Tomamine alkali surfactant, about 1.5 gal of Tomamine AO-14-2, about 1.5 gal of Tomamine Q-17-2, and about 2600 mL of caustic potash.

Intermediate Quat 1 can be quality tested via visual inspection as a clear liquid, pH testing of around 12.5-13.2, and specific gravity of around 1.00-1.06.

Step 2—Dilute Intermediate Quat 1 to create Intermediate Quat 2.

Into a 55 gal container, combine about 33 gal of soft water with about 22 gal of Intermediate Quat 1. A colored dye can be added to the composition at this stage, if desired. For example, about 24 g of green dye can be mixed in with Intermediate Quat 2.

Intermediate Quat 1 can be quality tested via visual inspection as a clear liquid, pH testing of around 12-12.5, and specific gravity of around 1.00-1.04.

Step 3—Make Intermediate dL.

In a 55 gal container, mix about 30.002 gal of Tomamine E-14-5, 15.251 gal of Tomamine E-17-5, and about 4.2521 gal of Tomamine alkali surfactant.

Step 4—Combine Intermediate Quat 2 with Intermediate dL and d-Limonene.

In a 55 gal container, combine about 32 gal of Intermediate Quat 2, about 5.36 gal of Intermediate dL, and about 2.64 gal of d-Limonene to create the final preferred composition.

Substitutions.

The disclosed composition can be further diluted with water and still work effectively as a cleaner, disinfectant and herbicide. For example, the composition described above can be diluted with water up to $1/64^{th}$ and still maintain effectiveness. Such a reduced concentration would be effective for a wipe application.

EDTA disodium salt can be substituted for BayPure CX (or the iminodisuccinic acid tetrasodium salt that is used).

Caustic soda may be substituted for caustic potash.

Sodium metasilicate pentahydrate may be substituted for anhydrous sodium metasilicate.

Tomamine AO-14-2 is an amine oxide. One of ordinary skill in the art will recognize that there are many other commonly known amine oxides that will perform in substitution.

Tomamine Q-17-2 is a quaternary ammonium compound. There are many other commonly known quaternary ammonium compounds that can be used.

Tomamine E-14-5 and E-17-5 are ethoxylated amines. There are other commonly known ethoxylated amines that can be used.

The quaternary amine may comprise between 0.5-5.0 wt. % of the composition. The quaternary amine may be a quaternary ammonium compound, and more particularly may be 75% active isodecyloxypropyl bis-(2-hydroxy-ethyl) methyl ammonium chloride.

The limonene may comprise between 2.0-12.0 wt. % of the composition.

The ethoxylated amine may comprise between 5.0-20.0 wt. % of the composition.

The amine oxide may comprise between 0.5-10.0 wt. % of the cleaning and herbicide composition. The amine oxide may be 50% active bis-(2-hydroxyethyl) isodecyloxypropylamine oxide.

The alkali surfactant may comprise between 0.5-10.0 wt. % of the composition. The alkali surfactant may be Tomamine alkali surfactant.

The tetrasodium iminodisuccinate may comprise between 0.25-8.0 wt. % of the composition.

The monoethanolamine may comprise between 0.25-6.0 wt. % of the composition.

The sodium silicate may comprise between 0.25-6.0 wt. % of the composition.

The caustic potash may comprises between 0.10-4.0 wt. % of the composition.

The at least one ethoxylated amine may include 2.0-12.0 wt. % poly (5) oxyethylene isodecyloxypropylamine, and 1.0-10.0 wt. % poly (5) oxyethylene isotridecyloxypropylamine.

The limonene may be d-limonene.

Water may comprise 30-95% wt. of the composition.

The composition may be applied at a pH of between 11.5 and 13.5.

One of skill in the art would understand the term "about" is used herein to mean that a concentration of "about" a recited percentage (%) produces the desired degree of effectiveness in the compositions and methods of the present invention. One of skill in the art would further understand that the metes and bounds of "about" with respect to the concentration of any component in an embodiment can be determined by varying the concentration of one or more components (all percentages listed herein are by weight, as would be understood by one of ordinary skill in the art), determining the effectiveness of the mixture for each concentration, and determining the range of concentrations that produce mixtures with the desired degree of effectiveness in accordance with the present disclosure. The term "about" is further used to reflect the possibility that a mixture may contain trace components of other materials that do not alter the effectiveness or safety of the mixture.

It will be understood that emollients, humectants, fragrances, coloring agents, and other components may be added to or used with the compositions and methods provided herein. One of skill in the art can select additional components and determine suitable amounts and formulations such that the final composition functions with the desired degree of effectiveness as provided herein.

The present invention contemplates that many changes and modifications may be made. Therefore, while the presently-preferred form of the system has been shown and described, and several modifications and alternatives discussed, persons skilled in this art will readily appreciate that various additional changes and modifications may be made without departing from the spirit of the invention, as defined and differentiated by the following claims.

What is claimed is:

1. A multi-purpose cleaner and herbicide composition comprising:
    a quaternary amine,
    a limonene,
    at least one ethoxylated amine,
    an amine oxide,
    tetrasodium iminodisuccinate, and
    water.

2. The composition of claim 1, further comprising an alkali surfactant.

3. The composition of claim 1, further comprising monoethanolamine.

4. The composition of claim 3, further comprising sodium silicate.

5. The composition of claim 1, further comprising caustic potash.

6. The composition of claim 1, wherein the quaternary amine comprises between 0.5-5.0 wt. % of the cleaning and herbicide composition, the limonene comprises between 2.0-12.0 wt. % of the cleaning and herbicide composition, the at least one ethoxylated amine comprises between 5.0-20.0 wt. % of the cleaning and herbicide composition; and the amine oxide comprises between 0.5-10.0 wt. % of the cleaning and herbicide composition.

7. The composition of claim 2, wherein the alkali surfactant comprises between 0.5-10.0 wt. % of the cleaning and herbicide composition.

8. The composition of claim 1, wherein the tetrasodium iminodisuccinate comprises between 0.25-8.0 wt. % of the cleaning and herbicide composition.

9. The composition of claim 3, wherein the monoethanolmine comprises between 0.25-6.0 wt. % of the cleaning and herbicide composition.

10. The composition of claim 4, wherein the sodium silicate comprises between 0.25-6.0 wt. % of the cleaning and herbicide composition.

11. The composition of claim 5, wherein the caustic potash comprises between 0.10-4.0 wt. % of the cleaning and herbicide composition.

12. The composition of claim 1, where the quaternary amine is a quaternary ammonium compound.

13. The composition of claim 1, wherein the quaternary amine is 75% active isodecyloxypropyl bis-(2-hydroxyethyl) methyl ammonium chloride.

14. The composition of claim 1, wherein the at least one ethoxylated amine includes 2.0-12.0 wt. % poly (5) oxyethylene isodecyloxypropylamine, and 1.0-10.0 wt. % poly (5) oxyethylene isotridecyloxypropylamine.

15. The composition of claim 1, wherein the amine oxide is 50% active bis-(2-hydroxyethyl) isodecyloxypropylamine oxide.

16. The composition of claim 1, wherein the limonene is d-limonene.

17. The composition of claim 1, wherein the water is 30-95% wt. of the cleaning and herbicide composition.

18. The composition of claim 1, wherein the composition is applied at a pH of between 11.5 and 13.5.

19. A multi-purpose cleaner and herbicide composition comprising:
a quaternary amine,
a limonene,
at least one ethoxylated amine,
an amine oxide,
sodium silicate, and
water.

20. The composition of claim 19, further comprising tetrasodium iminodisuccinate.

* * * * *